March 8, 1960 J. HAMMOND 2,927,335
PAN GREASING DEVICE
Filed Sept. 19, 1955

Inventor
Jane Hammond
By Fetherstonhaugh & Co.
Attorneys

United States Patent Office 2,927,335
Patented Mar. 8, 1960

2,927,335

PAN GREASING DEVICE

Jane Hammond, St. Laurent, Quebec, Canada

Application September 19, 1955, Serial No. 535,191

1 Claim. (Cl. 15—136)

This invention relates to applicators for greasing pans, etc. and is particularly applicable for applying grease to pans where it is essential that the grease be applied to the bottom and sides as in cake and pie pans.

The invention consists essentially in the provision of an applicator having a base portion and a reservoir handle portion, preferably made of a light plastic material with the walls of the handle portion forming the reservoir, being flexible, and a pad of sponge rubber or other suitable material attached to the underside of the base portion and to one side of the handle portion for the purpose of spreading the grease over the bottom surface and sides of the pan; the base portion of the applicator being made concave in order to allow free flow of the grease to the underside of the applicator pad.

The object of the invention is to provide an applicator from which the contents can be spread evenly over the bottom surface and sides of a pan in controlled amounts.

A further object of the invention is to provide an applicator which will allow free spreading of grease or the like evenly and without waste.

A further object of the invention is to provide a hand applicator for grease or the like in which the hand guiding the applicator is fully protected from the grease applying pad.

A further object of the invention is to provide a hand applicator for grease or the like which is light in weight and which can be readily cleaned of all grease.

In the drawings, which illustrate embodiments of the invention—

Figure 1:
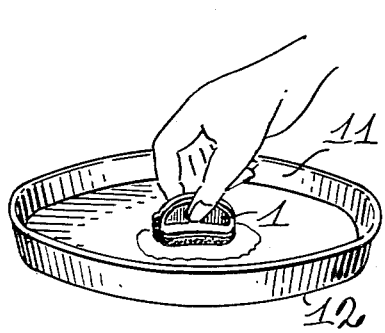
Fig. 1 is a perspective view showing the applicator being used to grease a pan.
Figure 2:
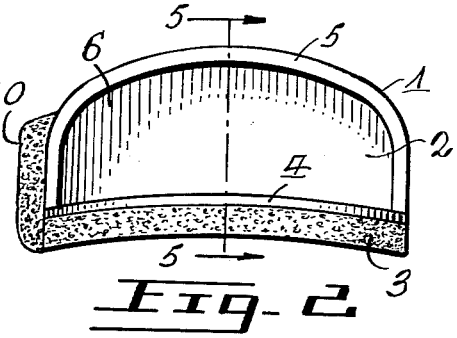
Fig. 2 is a vertical side elevation of the applicator.
Figure 3:
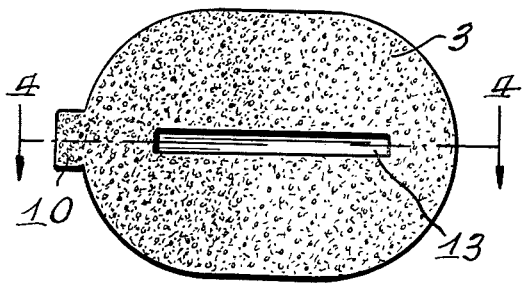
Fig. 3 is a bottom view of the applicator showing the reservoir opening.
Figure 5:
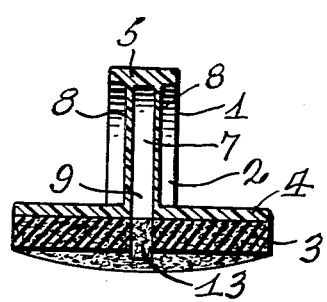
Fig. 5 is a vertical sectional view taken on the line 5—5 of Fig. 2 and showing the thin walled reservoir in the handle of the applicator.
Figure 4:
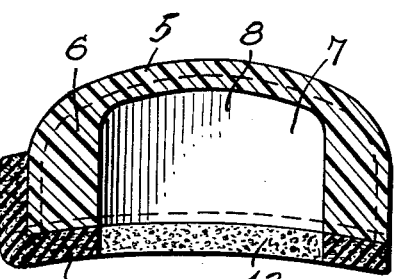
Fig. 4 is a vertical sectional view taken on the line 4—4 of Fig. 3.
Figure 6:
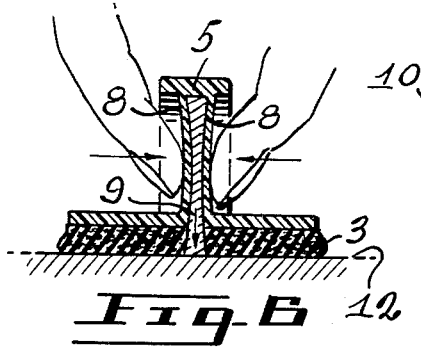
Fig. 6 is a sectional view similar to Fig. 5 but showing the applicator being pressed down on the surface of a pan and the thin walls of the reservoir being pressed inwardly to squeeze the grease out of the reservoir.

Referring to the drawings, the applicator 1 is composed of two portions, a handle portion 2 and an absorbent pad portion 3. The handle portion 2 can be made of any convenient material such as plastic, preferably moulded into any suitable shape and size to suit different applications. The applicator 1 is here shown as having a concave base plate 4 from which the handle 2 proper projects upwards in a plane at right angles to the plate 4. The handle 2 is formed of a reinforcing strip 5 projected upwards and lengthwise of the plate 4 and supports between it and the plate 4 the laterally extending central rib 6 which is hollowed out at 7 to form the reservoir for the grease or like material to be dispensed by the applicator. The relatively thin and flexible side walls 8 of the reservoir 7 can be displaced inwardly by pressure of the fingers of the hand as shown in Fig. 6, of the drawings in order to restrict the volume of the reservoir and force its contents out. The plate 4 is slotted at 9 to form the inlet and outlet to the reservoir 7.

The absorbent pad 2 is made of any suitable porous material such as soft sponge rubber and is secured to the under side of the plate 4. The pad 2 has an extended strip 10 cut to the same width as the strip 5 of the handle and is turned up and secured to the strip 5 at one end of the applicator. The strip 10 of the pad 2 extends upwards to a height equal to the average height of the side 11 of a baking pan 12. The absorbent pad 2 is slotted at 13 equal in size to the slot 9 and the exposed area of the reservoir 7.

The pad 3 is secured to the applicator by any suitable adhesive which will resist the action of grease and hot water or any other materials that the applicator is likely to come into contact with such as cleaning solutions.

In the use of the applicator as above described, the grease or other material to be spread by the applicator, is packed into the reservoir 7. The applicator is then placed on the surface of the baking pan 12 and is pressed downwards while at the same time the thin side walls 8 of the reservoir 7 are pressed inwards, thereby restricting the volume of the reservoir 7 and forcing a portion of its contents downwards through the slots 9 and 13 to permeate the pad 3. While downward pressure is exerted on the applicator and the side walls 8 are being pressed inwards, the applicator is moved over the surface of the pan to cover its surface with a smooth even layer of grease. As the grease permeates the pad 3 it will also spread into the upturned portion 10 so that as the applicator is moved around the edge 11 of the pan, that edge will also receive a thin smooth layer of grease. Therefore in one simple operation the whole surface of the pan 12, both bottom and sides, can be prepared for baking or cooking with a minimum of grease being dispensed while at the same time keeping the hand perfectly clean.

What I claim is:

A grease applicator comprising a hollow handle having end, top and side walls forming a grease retaining reservoir, the said side walls thereof being relatively thin and flexible and adapted to restrict the volume of said reservoir under side pressure, a concave supporting plate on the under side of said hollow handle and having side margins extending outwardly from the sides of said handle, and a grease applying absorbent pad of uniform thickness secured along the under side of said concave supporting plate and having an extension secured along one of said end walls of the handle, said pad and supporting plate being provided with a slot communicating with said reservoir.

References Cited in the file of this patent

UNITED STATES PATENTS

| | | |
|---|---|---|
| 948,110 | Lombard | Feb. 1, 1910 |
| 1,168,291 | Dengler | Jan. 18, 1916 |
| 2,234,558 | Huston | Mar. 11, 1941 |

FOREIGN PATENTS

| | | |
|---|---|---|
| 457,629 | Italy | May 29, 1950 |
| 636,288 | Great Britain | Apr. 26, 1950 |